Feb. 9, 1960   E. T. JOHNSON   2,924,466
ADJUSTABLE DRAFT MEMBER
Filed Nov. 7, 1956   3 Sheets-Sheet 1

INVENTOR.
E. T. JOHNSON

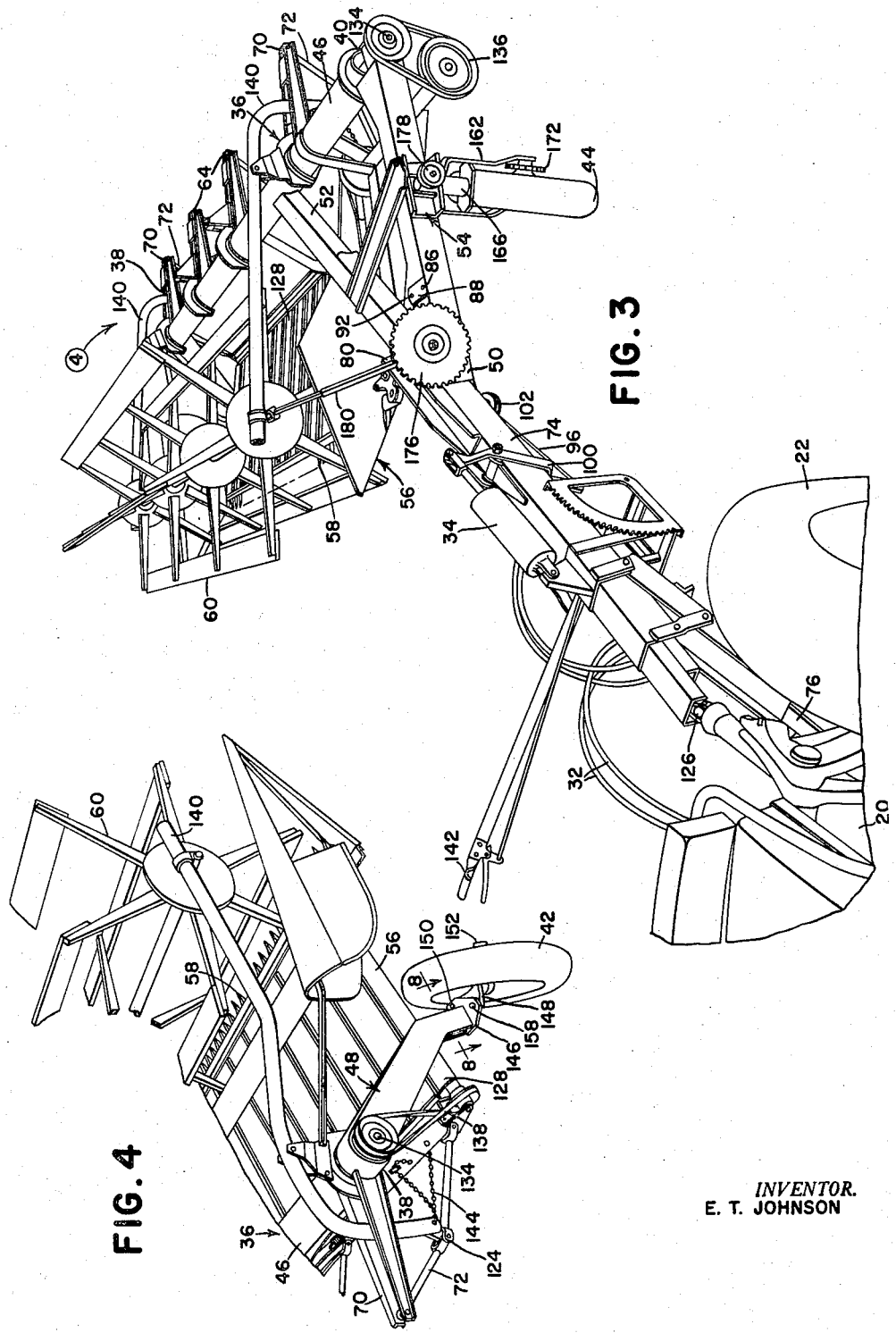

Feb. 9, 1960     E. T. JOHNSON     2,924,466
ADJUSTABLE DRAFT MEMBER
Filed Nov. 7, 1956     3 Sheets-Sheet 3
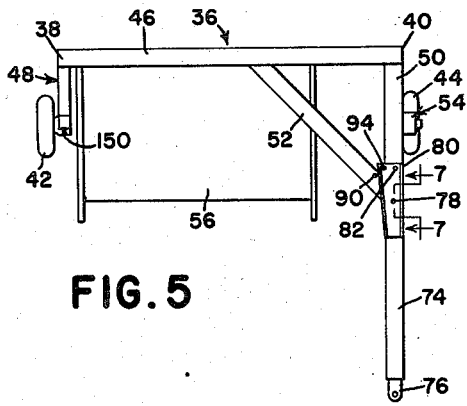
FIG. 5
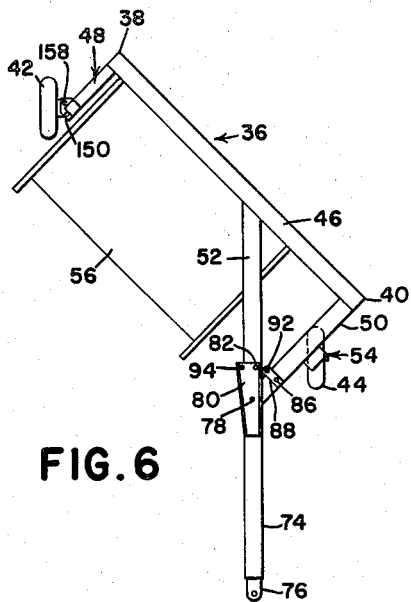
FIG. 6
FIG. 7
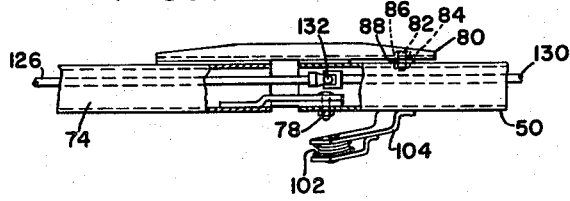
FIG. 9
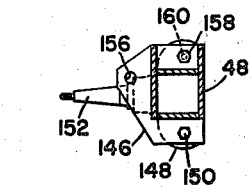
FIG. 8
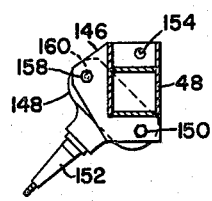
FIG. 10
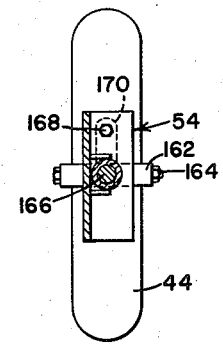
FIG. 11
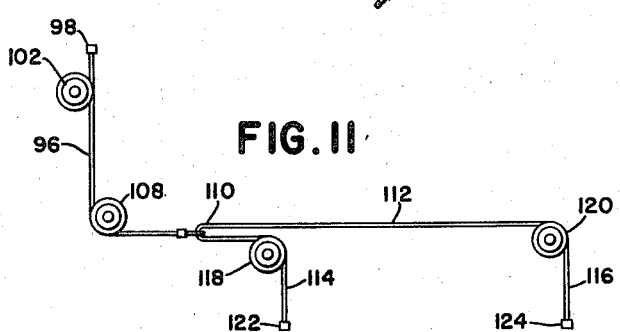
*INVENTOR.*
E. T. JOHNSON United States Patent Office 2,924,466
Patented Feb. 9, 1960

2,924,466

ADJUSTABLE DRAFT MEMBER

Ellsworth T. Johnson, Moline, Ill., assignor, by mesne assignments, to Deere & Company, a corporation of Delaware Application November 7, 1956, Serial No. 620,956

1 Claim. (Cl. 280—462)

This invention relates to an agricultural machine and more particularly to such machine of the type having a substantial width transverse to the line of advance.

A typical machine is the windrow harvester, normally drawn behind a tractor or other propelling vehicle and having a platform of substantial width in order to harvest a relatively wide swath. Machines of this character, especially those bordering on widths of ten, twelve and sixteen feet, are difficult to transport over roads and highways and through gates. In the past, provision has been made for transporting such vehicles by various arrangements utilizing transport wheels, whereby the wide frame is turned lengthwise so that the transverse space normally occupied thereby is considerably reduced. However, arrangements of this character have many defects, primarily because the additional wheels must always be available, considerable effort is entailed in converting the machine and the additional wheels add to the cost thereof.

According to the present invention, these defects are eliminated by the provision of a harvester, for example, in which the wheels that carry the machine in its operating position also carry the machine in its transport position. The invention features the provision of wheels which may be turned about vertical axes relative to the frame, together with a hitch means including a pivotal connection to the frame on an upright axis, whereby the frame may occupy a position in which its width, normally transverse to the line of advance, is at least oblique to the line of advance, thereby reducing the over-all width of the outfit. Further objects of the invention reside in improved control means for operating an adjustable part on the machine, the control means including a force-transmitting connection having a flexible element in vertical alinement with the hitch-to-frame pivot so that the force-transmitting means is unaffected by angular positioning of the hitch relative to the frame; improved drive means including a flexible connection in alinement with the hitch for the purposes set forth in connection with the force-transmitting means; improved mounting means for the wheels, one of which is lockable in either the transport or operating position of the machine and the other of which is lockable in the operating position and is free to swing or caster in the transport position; and such other objects and features as will appear in connection with the disclosure of the harvester, by way of example, in the ensuing specification and accompanying sheets of drawings, the several figures of which are described immediately below.

Fig. 3 is a front perspective view of the machine in its transport position.

Fig. 4 is a fragmentary rear perspective view, as seen in the direction of the arrow bearing the encircled numeral 4 in Fig. 3, illustrating the outboard or rear wheel of the machine.

Fig. 5 is a somewhat diagrammatic plan view, on a reduced scale, showing the relationship between the main frame and the hitch of the machine when the machine is in its operating position.

Fig. 6 shows the relationship of the parts when the machine is in its transport position.

Fig. 7 is a fragmentary view, partly in section and drawn to an enlarged scale, as seen generally along the line 7—7 of Fig. 5.

Fig. 8 is a sectional view as seen substantially along the line 8—8 of Fig. 4.

Fig. 9 is a view similar to Fig. 8 but showing a different position of the axle for the wheel involved.

Fig. 10 is a fragmentary sectional view as seen along the line 10—10 on Fig. 1.

Fig. 11 is a pictorial illustration of the flexible element of the force-transmitting device for controlling an adjustable part on the main frame.

Figure 1:
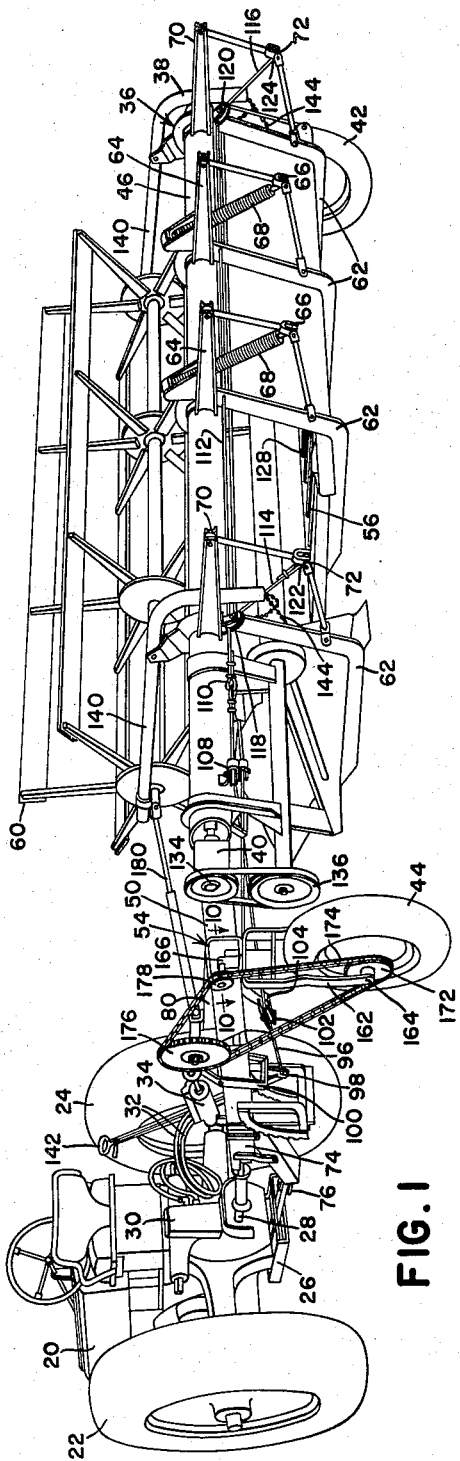
Fig. 1 is a rear perspective view of a typical tractor-harvester outfit embodying the principles of the invention, the machine being in its operating position.
Figure 2:
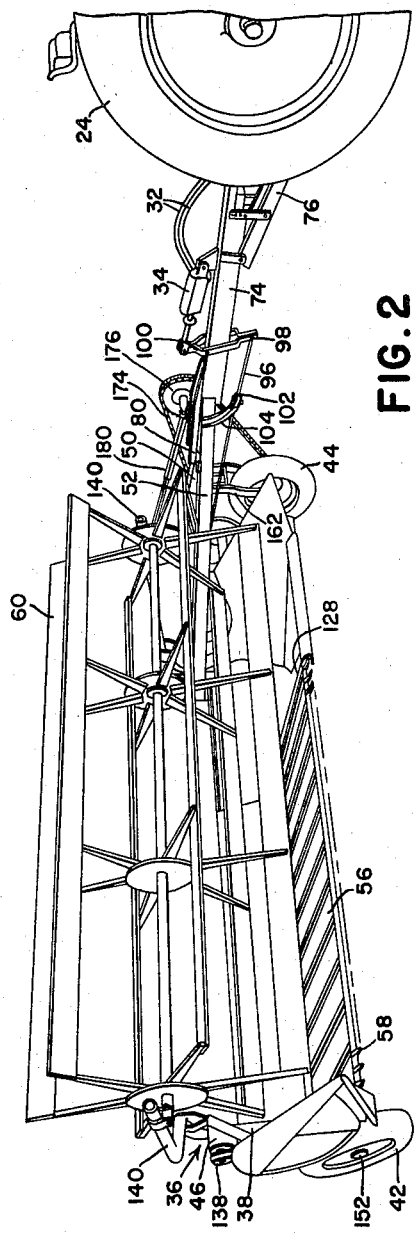
Fig. 2 is a front perspective view of the same.

The propelling or draft vehicle illustrated here as means for drawing the harvester over the ground is a typical agricultural tractor having a main body 20 supported on rear traction wheels 22 and 24 and equipped with a rear-mounted drawbar 26, a rearwardly extending power take-off shaft 28 and a power lift housing 30 which contains power lift mechanism of any suitable type, such as that illustrated in Jirsa et al. 2,532,552, one of the characteristics of which is its ability to furnish fluid under pressure through hose lines, such as shown at 32, to a force-transmitting device such as a remote hydraulic cylinder and piston assembly 34. As will be brought out below, the hydraulic motor 34 is used for adjusting certain parts of the trailing machine.

The trailing machine is here shown as a windrower having a main frame 36 provided with first and second opposite ends 38 and 40 and supported at these ends respectively by first and second wheels 42 and 44. The main frame comprises essentially a rear transverse tubular member 46 having at its right hand or outboard side a forwardly and downwardly projecting leg 48 which comprises part of frame-supporting means associated with the wheel 42. At its other end the frame 36 has a forwardly extending tubular member or part 50, and this part is braced to the cross member 46 by a diagonal tubular member 52. Bracket means 54 serves as part of frame-supporting means associated with the other wheel 44. The two wheel-to-frame connections will be described in detail below. The frame, as is typical of machines of the windrower or harvester type, carries an adjustable part, here a vertically adjustable platform 56 across the leading or front edge of which is provided a cutter bar 58 of typical construction. A rotatable reel 60 is mounted over the platform 56 in conventional fashion.

The platform 56 is supported on the transverse cross member or cross pipe 46 for vertical adjustment, by means of a plurality of L-shaped frame members 62 having their upright portions journaled on the cross pipe and their forwardly extending portions appropriately connected to the platform. A pair of rearwardly extending supports 64, rigidly affixed to the cross pipe 46, cooperate respectively with toggles 66 and compression springs 68 for counterbalancing the weight of the platform. A second pair of rearwardly extending supports 70 are rigidly secured to the cross pipe 46 and are associated respectively with a second pair of toggles 72. Each toggle 72, like each toggle 66, is connected between the associated support and the associated L-shaped platform-supporting member 62 in such manner that when the joint of the toggle is moved forwardly, the platform 56 is raised about the axis of the cross pipe 46. The means for effecting raising and lowering of the platform will be described below. Suffice it to note for the present that the power therefore is derived from the power lift cylinder 34.

The machine includes, in addition to the main frame 36 and the presently described components, a forwardly extending hitch member 74 which has its forward end provided with clevis means 76, for example, for connection to the drawbar 26 of the tractor. An intermediate portion of the hitch member is pivoted to the end member 50 of the frame 36 on an upright pivot at 78. When the machine is in its operating position (Fig. 5), the rear portion of the hitch member, as at 80, lies in superposed relationship to the frame member 50. In the particular instance shown, the hitch member 74 is in effect an extension of the frame member 50. In this position of the machine, the main frame 36 is generally transverse, here normal to the line of advance, so that the angle between the main frame and the hitch member 74 is a right angle or substantially so. Retention of this angle for the operating or first position of the machine is accomplished by the provision of releasable locking means cooperative between the rear end portion 80 of the hitch and a portion of the main frame 36. As best shown in Figs. 5, 6 and 7, this releasable means comprises a nut and bolt assembly 82 which, in the operating position of the machine, is passed through an aperture 84 in the hitch member rear end portion 80 and a registering aperture 86 in a mounting strap 88 rigidly secured to the main frame end member 50. As shown in Fig. 7, the rear end portion 80 may be in the form of a separate member rigidly secured, as by welding or any other suitable means, to the hitch member 74 so that it lies over the forward part of the main frame end member 50.

The releasable means 82 may be removed from the position just described and replaced through the aperture 84 and an aperture 90 in the diagonal frame member 52. This will permit angular swinging of the hitch member 74 relative to the main frame 36 so that the position of Fig. 6 is achieved. That is to say, the apertures 86 and 90 are angularly spaced apart about the pivot 78 as a center. If desired, and as shown here, additional apertures 92 and 94 may be provided to receive additional securing means like the nut and bolt assembly 82.

From the description thus far, it will be seen that the machine, when in its operating position (Fig. 5), has its length transverse to the line to travel so that its opposite ends 38 and 40 are spaced relatively widely apart in a transverse direction. This disposes the wheels 42 and 44, which are here substantially coaxial, in relatively widely spaced lateral relationship. Both wheels run of course in fore-and-aft planes or in tracks parallel to the line of advance as the machine is drawn forwardly over the field by the draft vehicle or tractor. The hitch-locking means 82 retains the angle between the main frame and the hitch member so that there is no departure from that angle during operation of the machine.

When the machine is in its operating position, the components thereof function in a normal fashion; that is, the cutter bar operates to sever the standing grain, which is moved rearwardly onto the platform by the rotating reel 60. Vertical adjustment of the platform to accommodate different cutting heights can be accomplished while the machine is in motion. Part of the mechanism for doing this has been described above as including the toggles 72 as assisted by the spring-loaded toggles 66. Reference was also made to the remote hydraulic cylinder 34 as the source of power.

The force-transmitting means connected between the cylinder 34 and the toggle 72 comprises a flexible strand-like element in the form of a cable 96 connected at its forward end at 98 to a lever 100 that is swingable on the hitch member 74 about a transverse axis and powered by the piston of the cylinder 34. The cable 96 extends rearwardly and then laterally, being trained about a guide or sheave 102, which sheave is appropriately supported by a bracket 104 so that the axis of the sheave is substantially in vertical alinement wtih the hitch-to-frame pivot 78 (Fig. 7). The cable extends further rearwardly and is trained about a second sheave 108 and is connected to the loop 110 of a second cable 112 which has a pair of runs 114 and 116 trained respectively about additional sheaves 118 and 120 and dead-ended at 122 and 124 respectively to the toggles 72. Extension and retraction of the motor 34 swings the lever 100 which operates through the flexible cables 96 and 112 to raise and lower the platform 56. Of significance here is the location of the sheave 102 in substantial vertical alinement with the hitch-to-frame pivot 78 so that even though the frame swings relative to the hitch between the positions of Figs. 5 and 6 the force-transmitting means is not seriously affected, if at all.

The hitch member 74 is tubular, at least in part (Fig. 7) and houses the forward shaft part 126 of drive shafting by means of which the tractor power take-off 28 is connected to the machine to drive the movable parts thereof, such as to drive the usual canvas 128 on the platform 56. A second shaft part 130 is coaxial with the shaft part 126 and is housed in the tubular end frame member 50 (Fig. 7) and a universal joint or equivalent flexible connection 132 interconnects the two shaft parts. This connection is in substantial vertical alinement with the hitch-to-frame pivot 78 so that changes in angularity between the hitch member 74 and frame 36 do not affect the drive. As best suggested in Figs. 1 and 4, a shaft 134 extends coaxially through the tubular cross pipe 46 and is connected at the left hand end of the frame by appropriate belt and sheave means 136 to drive the cutting mechanism 58. Belt and sheave means 138 at the opposite end of the frame provides means for driving the canvas 128 from the shaft 134.

The reel 60 is supported by reel-carrying arms 140, and these are suitably pivotally mounted on the main frame for vertical movement so that the height of the reel relative to the platform may be adjusted. A hand lever 142 is appropriately connected to depending rear portions of the arm 140 by any suitable means, here in the form of chains 144.

As previously described, the right hand or outboard wheel 42 is connected in frame-supporting relationship to the frame 36 by wheel-mounting means including the leg 48. As best shown in Fig. 8, the lower portion of the leg 48 terminates in a substantially horizontal plate 146 and a wheel-mounting bracket 148 is pivoted to this plate on an upright pivot 150. The bracket carries an axle or spindle 152 on which the wheel 42 is journaled. The plate 146 has a pair of apertures 154 and 156, spaced angularly apart about the upright pivot 150 as a center. Releasable wheel-locking means in the form of a removable nut and bolt assembly 158 is selectively usable in the apertures 154 and 156, passing through an aperture 160 in the mounting bracket 148, which aperture is adapted to selectively register with either of the apertures 154 or 156. As shown in Fig. 9, the locking means 158 is passed through the registered apertures 160 and 154, thereby holding the wheel 42 in its straight-ahead position; or, rather, in a position in which it is not only parallel to the line of advance of the machine but has its axis parallel to the cross pipe 46, because in the particular situation shown the frame 36 in its operating position is normal to the line of advance.

When the frame is running in its second or transport position, as shown in Fig. 6, the releasable means 158 has been removed from the relationship it occupies in Fig. 9 and is replaced as shown in Fig. 8. That is to say, the bolt 158 now passes through the registered apertures 156 and 160, whereby the wheel spindle 152 occupies a different angular relationship to the frame, here 45° or approximately so. Hence, the angle between the wheel 42, which still travels a straight-ahead path, and the frame 36 is different from what it was in Fig. 5. Hence, the mounting means 48 is capable of carrying the frame on the wheel 42 in such manner that the frame and wheel may have relative swinging about the upright pivot 150.

Approximately the same result is achieved by the mounting means 54 for the left hand or inboard wheel 44. As best shown in Fig. 10, this wheel is carried by wheel-mounting means including a castering fork 162 which has a transverse axle 164 on which the wheel 44 is journaled and which further has an upright spindle 166 appropriately journaled in the bracket 54, it being understood that this bracket is rigidly secured to the inboard upright side of the main frame end member 50. The wheel-locking means for this wheel is again a releasable or removable nut and bolt assembly 168 which, when the machine is in its operating position, passes through an aperture in the bracket 54 and a registering aperture in a rearwardly extending arm 170 rigid with the upstanding spindle 66 and disposed below the bracket 54. When the locking means or bolt 168 is in place, the wheel 44 occupies the position shown in Fig. 5. That is to say, it is locked against swinging about the upright pivot afforded by the castering spindle 166.

When the machine is conditioned for transport, the releasable locking means between the hitch and frame, comprised here by the removable bolt 82, is removed from the position it occupies in Fig. 5, and the two wheel-locking means 158 and 168 are removed. As the machine is drawn forwardly, it will automatically swing back to the position of Fig. 6, which is occasioned because of the inboard location of the hitch member 74 at the inboard or left hand end 40 of the frame. As the frame advances, the wheels automatically swing into trailing relation so that they again track along the line of advance and the oblique position of the frame 36 occupies, of course, a different angle relative to the line of advance. The present machine is designed so that the acute angle between the frame 36 and the line of advance is approximately 45°. The two holes 154 and 156 in th wheel-mounting plate 146 (Fig. 8) are calculated on the basis of this angle and, when the wheel 42 swings around to its Fig. 6 position, the bolt 158 is replaced in the now registering apertures 156 and 160, whereupon the wheel is again locked to retain the new angular relationship thereof to the oblique frame 36.

The wheel 44, however, is allowed to caster. That is, the releasable locking means 168 is not restored, but the bolt 168 is removed and placed elsewhere for safe keeping. Hence, in the transport position of the machine, after the locking means 158 has been placed in its new position and the hitch-locking means 82 has been placed in its new position, the hitch member 74 is again rigid with the frame and the frame is supported at three points on the hitch clevis 76 (to the tractor drawbar 26), the right hand wheel 42 and the left hand wheel 44. The machine admirably tracks the tractor on corners and other turns because of the castering freedom of the wheel 44.

In the present instance, the reel 60 is driven in the first instance from the inboard wheel 44, which wheel is equipped with a sprocket 172 about which a chain 174 is trained, this chain being also trained about a sprocket 176 and an idler 178 on the main frame end member 50; a telescopic shaft 180 extends between and interconnects the sprocket 176 and the reel 60. Since the wheel 44 swivels relative to the main frame when the main frame is changed from its operating position (Fig. 5) to its transport position (Fig. 6), it is necessary to remove the chain 174. Consequently, Fig. 4 appears with the chain removed, since Fig. 4 shows the transport position of the machine.

From the foregoing description it will be seen that the objects of the invention are achieved in the preferred embodiment and result in the availability for transport of a relatively wide machine by means of the same wheels that are used in operating the machine. These wheels are bi-positionable so that the machine may be drawn in either of the Fig. 5 or Fig. 6 positions. The force-transmitting means between the power lift cylinder 34 and the platform adjusting toggles 72 includes the cable 96 which is trained about the guide or sheave 102 which in turn is in substantially vertical alinement with the hitch-to-frame pivot 78. The same characteristic is present as to the interconnection at 132 between the propeller shaft parts 126 and 130. Therefore, in changing from the Fig. 5 position to the Fig. 6 position, the force-transmitting means and the propeller shaft means need not be disturbed or rearranged. The hitch-locking means, as well as the wheel-locking means are simple in construction and easy to operate. The relationship of the hitch member 74 to one end of the frame 36 enables the frame to assume either of its positions upon the application of fore-and-aft force thereto. For example, after release of the necessary locking means, a forward force on the hitch member 74 will cause the frame to swing back to its Fig. 6 position. Likewise, with the locking means released, a rearward force on the frame will cause it automatically to assume the Fig. 5 position, thereby facilitating the change-over from one position to the other.

Although the disclosure relates to a windrower of the drawn or trail-behind type, it will be understood that the principles of the invention are applicable to any machine whether it is drawn, pushed or propelled alongside a propelling vehicle. Therefore, such expressions as "front," "rear," "right," "left," etc. are used for the purposes of convenience and not limitation.

Features of the invention not categorically enumerated will undoubtedly occur to those versed in the art, as will many modifications and alterations in the preferred embodiment disclosed, all of which may be achieved without departing from the spirit and scope of the invention.

What is claimed is:

An agricultural machine adapted to advance over the ground in trailing relation to a draft vehicle comprising: a main frame having first and second opposite ends and arrangeable in a first position with said ends spaced apart generally transverse to the line of advance; first and second frame-supporting wheels respectively at said first and second frame ends and generally transversely alined with each other and running parallel to the line of advance, each wheel including frame-supporting means having an upright pivot about which the frame and the respective wheel are relatively swingable; first and second wheel-locking means respectively locking both wheels against swinging in the first position of the frame; a single fore-and-aft hitch member having front and rear portions and connected intermediate said portions to the frame on an upright hitch pivot so that the rear portion of said member and the adjacent part of the frame are in superposed relation and the front portion of said member extends forwardly beyond the frame, said front portion having means thereon for pivotal connection to the draft vehicle; hitch-locking means releasably connected between said rear hitch member portion and portions of the frame angularly spaced apart relative to the hitch pivot independently of the draft vehicle to retain a fixed angle between said hitch member and frame in said first position of the frame; said hitch-locking means and both wheel-locking means being releasable while the hitch member and the wheels remain mounted on the frame via their respective pivots to enable the frame to swing about the hitch and wheel pivots to a second position at a different angle to the line of advance so that the ends of the frame and the wheels are spaced apart generally fore-and-aft and the transverse space occupied by said frame is reduced; said hitch-locking means being relockable to retain said second position of the frame relative to the hitch member; one of said wheel-locking means being re-lockable in said second position of the frame to secure the different angle between the frame and the respective one wheel with said one wheel running parallel to the line of advance; and the other wheel-locking means remaining released to enable free swinging of said other wheel about its upright pivot.

References Cited in the file of this patent

UNITED STATES PATENTS

| | | |
|---|---|---|
| 1,416,753 | Ray | May 23, 1922 |
| 2,532,164 | Hansen et al. | Nov. 28, 1950 |
| 2,658,770 | Koenig | Nov. 10, 1953 |
| 2,672,721 | Adams | Mar. 23, 1954 |
| 2,719,395 | Heitshu | Oct. 4, 1955 |
| 2,759,315 | Martin | Aug. 21, 1956 |